United States Patent
Vandehey et al.

(10) Patent No.: US 8,611,929 B1
(45) Date of Patent: Dec. 17, 2013

(54) METHOD AND SYSTEM FOR AUTOMATICALLY ADDING RELATED EVENT INFORMATION TO SOCIAL MEDIA LOCATION UPDATES

(75) Inventors: Jeremy Vandehey, San Francisco, CA (US); Mack McConnell, San Francisco, CA (US); Brandon Gador, San Francisco, CA (US)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 13/405,719

(22) Filed: Feb. 27, 2012

(51) Int. Cl.
*H04W 24/00* (2009.01)

(52) U.S. Cl.
USPC ............ 455/456.3; 707/E17.108; 707/E17.11

(58) Field of Classification Search
USPC ......... 455/456.1, 456.2, 456.3; 707/769, 770, 707/780, E17.005, E17.013, E17.018, 707/E17.059, E17.066, E17.06, E17.107, 707/E17.108, E17.109, E17.11
See application file for complete search history.

(56) References Cited

U.S. PATENT DOCUMENTS

| | | | |
|---|---|---|---|
| 8,200,247 B1 * | 6/2012 | Starenky et al. | 455/456.3 |
| 2006/0208943 A1 * | 9/2006 | Gronemeyer | 342/357.12 |
| 2008/0133697 A1 * | 6/2008 | Stewart et al. | 709/217 |
| 2011/0047182 A1 * | 2/2011 | Shepherd et al. | 707/780 |

* cited by examiner

*Primary Examiner* — San Htun
*Assistant Examiner* — Magdi Elhag
(74) *Attorney, Agent, or Firm* — McKay and Hodgson, LLP; Philip McKay; Sean P. Lewis

(57) ABSTRACT

A process for automatically adding related event information to social media location updates integrates one or more event data sources into the social media location update process and thereby provides the ability to automatically identify events associated with the identified location of a social media location update and automatically include information describing the identified event in a social media location and event update posting.

21 Claims, 2 Drawing Sheets

METHOD AND SYSTEM FOR AUTOMATICALLY ADDING RELATED EVENT INFORMATION TO SOCIAL MEDIA LOCATION UPDATES

BACKGROUND OF THE INVENTION

Social media systems, websites, and networks have enjoyed tremendous popularity over the past several years. Herein, social media systems, social media websites, and social media networks, regardless of distribution and/or access means, are collectively referred to as "social media systems". Herein, social media systems include, but are not limited to, computing system implemented networks, systems, and sites that allow users to provide content, often in the form of posts, about themselves and to track and view posts from selected other users of the social media system.

Specific examples of currently available social media systems include, but are not limited to: Facebook™; Twitter™; Linkedin™; Bebo™; Classmates.com™; Google Buzz™; MySpace™; and many other post, blogging, and user content provided, websites/networks as discussed herein, and/or as known in the art at the time of filing, and/or as developed after the time of filing.

A relatively new, and very popular, feature associated with social media systems is the "user location update" feature whereby a user can inform their friends/follows of their location thru semi-automatically, or automatically, generated posts indicating the user's location and/or the business associated with that location. A specific illustrative example of a user location update feature is the "check-in" feature currently provided within the Facebook™ social media system.

The user location update feature has proven popular and useful not only to let a user's friends know where the user is located, but also to learn if the user's friends are nearby at the same time. One of the key attributes that has contributed to the popularity and usefulness of the user location update feature is the minimal user data input required and the semi-automatic, or automatic, aspect of the user location update feature that allows the user to post their location without the need to enter any text, or provide significant other user input. However, current user location update features suffer from an information gap in that current user location update features do not provide information about what the user is doing at the identified business/place, at least without significant additional user data input.

For instance, currently, when a user implements a user location update feature, such as when a user "checks-in" to a Facebook™ place or business, the standard posting that is automatically generated is not specific to, nor in way describes, any event or activity the user is attending at the identified business/place. Instead, the standard posting that is automatically generated merely provides the location and name of the business/place from which the user is checking in. This is a fairly limiting situation since, in many cases, a user is "checking in" from a given a place or business because there is a specific event that is going on at the place or business, such as a concert, movie showing, poetry reading, public meeting, etc. Despite the fact that the event/activity the user is attending is often the more interesting information, using current user location update features this information is not communicated as part of the average user location update posting. As a result, not only is this potentially interesting information never provided to the user's friends, a significant source of potential publicity for the event, and/or the business/place hosting the event, is currently not utilized/exploited.

Instead, using currently available user location update features, if the user desires to provide a more accurate, and arguably more interesting, post that indicates the event the user is attending, the user must manually enter data, typically via text entry. However, as noted above, one of the main attractions of the user location update feature, and a main source of the current popularity of the user location update feature, is the minimal user data input required and the semi-automatic, or automatic, aspect of the user location update feature that allows the user to avoid entering any text, or providing significant input. As a result, currently, a user is faced with the choice of either not informing the user's friends of the event the user is attending via the user location update post, or spending time entering text about the event when the user should instead be enjoying the event.

What is needed is a method and system that allows a user to include data indicating an event/activity associated with the user's presence at the location identified in a user location update posting without requiring significant additional user input or text data entry.

SUMMARY OF THE INVENTION

In accordance with one embodiment, a process for automatically adding related event information to social media location updates provides the ability to automatically identify events associated with the identified location of a social media location update and then automatically include information describing the identified event in a social media location and event update posting.

In one embodiment, once the data indicating the location, date, and time, associated with a social media location update request are obtained, the data indicating the location, date, and time, associated with a social media location update request is used to search one of more event data sources/databases so that an event associated with the user's identified location can also be identified. In one embodiment, information associated with the event is then obtained and automatically included in the social media location and event update posting for the user.

Using the method and system for automatically adding related event information to social media location updates, as discussed herein, users of social media systems can provide more detailed location update postings that not only indicate the user's location, but also the event the user is attending at the location; all without having to manually enter additional text or provide any significant additional user input. Consequently, using the method and system for automatically adding related event information to social media location updates, as discussed herein, not only are users provided the ability to relatively effortlessly post more interesting and accurate location updates, but businesses and other public forums hosting the events are provided a new marketing and advertisement opportunity for the businesses/forums and the events they host.

BRIEF DESCRIPTION OF THE DRAWINGS

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Figure 1:
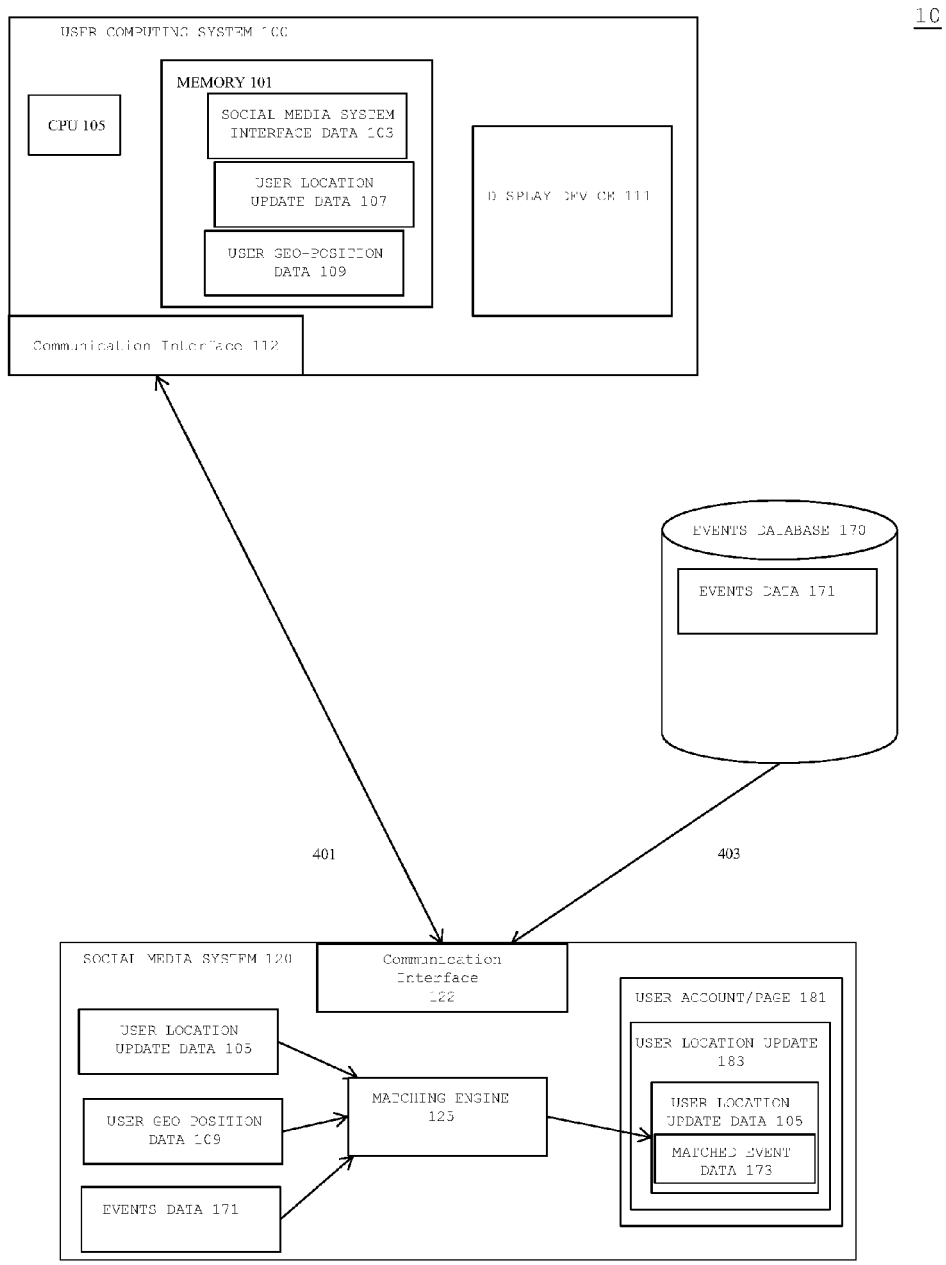
FIG. 1 is a block diagram of an exemplary hardware architecture for implementing one embodiment.

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In one embodiment, a user is provided access to a social media system through a user computing system.

In one embodiment, once the user has accessed a social media system through the user computing system, the user initiates a user location and event update feature through the social media system, in one embodiment by activating a user location and event update icon, symbol, etc., from a user interface screen for the social media system displayed on a mobile user computing system, such as a smart phone.

In one embodiment, once the user initiates the user location and event update feature, the user's geo-position data is obtained/determined.

In one embodiment, the user's geo-position data is then used to identify one or more businesses, or other identified "locations", such as a school, mall, auditorium, government facility, or other public place, associated with the user's geo-position data. In one embodiment, the user selects a correct one of the one or more businesses or identified locations as the current location of the user.

In one embodiment, in addition to data indicating the selected business or other location of the user, other user location update data such as data indicating the time and the date is obtained.

In one embodiment, data indicating the selected business or other location of the user and the time and date data is used to search one or more event data sources/event databases for one or more events that "match", or most closely match, the data indicating the selected business or other location of the user and the time and date data.

In one embodiment, as a result of the search of the one or more event data sources/event databases using the data indicating the selected business or other location of the user and the time and date data, one or more events that match, or most closely match, the data indicating the selected business or other location of the user and the time and date data are identified.

In one embodiment, the one or more identified events are then presented to the user in a potential events listing displayed on a display device of the user computing system that includes all identified potential events the user may be attending at the identified location. In one embodiment, the user then selects the actual event the user is attending by clicking, or otherwise selecting, highlighting, or activating, the correct event entry in the potential events listing via a user interface device and the display device of the user computing system.

In one embodiment, only a single event that matches, or most closely matches, the data indicating the selected business or other location of the user and the time and date data is identified. In one embodiment, the single identified event is presented to the user in the potential events listing displayed on a display device of the user computing system and the user confirms the user is attending the event by clicking, or otherwise activating, a confirmation symbol and/or the single event entry in the potential events listing via a user interface device and the display device of the user computing system. In one embodiment, the user pre-authorizes the process for automatically adding related event information to social media location updates to automatically select any single event entry that is the only identified event, without further user input.

In one embodiment, once the actual event the user is attending is identified, data associated with the event is obtained. In one embodiment, the data associated with the event includes, but is not limited to: the name of the event and/or the featured elements of the event, such as a concert name or the names of the bands performing; the scheduled start time and/or runtime of the event; the status of event, i.e., private, public, sold out, etc., and/or any other information regarding the event deemed of interest or potential interest to a reader of the post.

In one embodiment, the data associated with the event includes a brief description of the event with, or without, a story-like narrative of the event and why the event is interesting. In one embodiment, the data associated with the event includes information identifying, and/or describing the business or location sponsoring the event and/or any other forum/venue associated with the event.

In various embodiments, the data associated with the event is obtained from one or more of the event databases and/or event data sources. In various embodiments, the data associated with the event is obtained from any source of event data as discussed herein, and/or as known/available in the art at the time of filing, and/or as developed/made available after the time of filing.

In one embodiment, once the data associated with the event is obtained, any, or all, of: the data indicating the identified business or other location of the user; data indicating the identified event the user is attending at the identified business or other location of the user; the data associated with the event the user is attending at the identified business or other location of the user; and/or the other location update data, such as time and date data, is used to automatically generate a user location and event update posting, such as a modified Facebook "check-in" posting, that details not only the business or other location of the user at the time of the posting, but also the event the user is attending at the business or other location.

In one embodiment, the user location and event update posting is then automatically posted on the user's presence within the social media system, such as the user's account or webpage within the social media system, and/or is distributed to pre-selected friends or other contacts associated with the user via any posting mechanism associated with a social media system, as discussed herein, and/or as known in the art/available at the time of filing, and/or as developed/made available after the time of filing.

In one embodiment, the user location and event update postings for multiple users, and/or the data indicating the identified business or other location of the users and data indicating the identified event the users are attending at the identified business or other location, is analyzed and used to improve the matching of the event to the given identified business or other location, i.e., location and event data in the user location and event update postings for multiple users linking/matching a given event with a given location is used to provide a self-learning feedback loop to improve the event and location matching for other user location and event update postings during a relevant time frame for the event.

Hardware Architecture

FIG. 1 shows a block diagram of an exemplary hardware system 10 suitable for implementing one embodiment of a process for automatically adding related event information to social media location updates, such as exemplary process 200 of FIG. 2, discussed below.

Returning to FIG. 1, exemplary hardware system 10 includes: a user computing system 100, e.g., a computing system accessible by a user such as a mobile phone; an events database 170, e.g., an events data source or database including events data, such as an events calendar; a social media system 120, e.g., a computing system, website, and/or database, associated with a social media system; and communication channels 401 and 403.

In various embodiments, user computing system 100 is any computing system as discussed herein, and/or as known in the art/available at the time of filing, and/or as developed/made available after the time of filing.

As used herein, the term "computing system", includes, but is not limited to: a desktop computer; a portable computer; a workstation; a two-way pager; a cellular telephone; a smart phone; a tablet computing system; a notebook computing system; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; smart phones; two-way pagers; PDAs; media players; server computers; or any desired combination of these devices, that are coupled to perform the processes and/or operations as described herein.

In one embodiment, user computing system 100 is a mobile computing system.

Herein, the term "mobile computing system" and "mobile device" are used interchangeably and include, but are not limited to: a portable computer; a two-way pager; a cellular telephone; a smart phone; a tablet computing system; a notebook computing system; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein.

In addition, as used herein, the term mobile computing system and/or mobile device, can denote, but is not limited to, computing systems made up of multiple: wireless devices; cellular telephones; smart phones; digital telephones; two-way pagers; PDAs; tablet computing systems; a notebook computing systems; media players; or any desired combination of these devices and/or computing systems, that are coupled to perform the processes and/or operations as described herein.

In some embodiments, one or more mobile computing systems are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, user computing system 100 is representative of one or more computing systems. In one embodiment, user computing system 100 includes a processor CPU 105, a memory 101, and a display device 111.

As seen in FIG. 1, memory 101 includes social media system interface data 103 that includes instructions and data for providing user computing system 100 access to one or more social media systems, such as social media system 120, and/or generates one or more social media system interface displays on a display device associated with user computing system 100, such as display device 111.

Herein, social media systems, social media websites, and social media networks, regardless of distribution and access means, are collectively referred to as "social media systems". Herein, social media systems include, but are not limited to, computing system implemented networks, systems and sites that allow users to provide content, often in the form of posts, about themselves and to track and view posts from selected other users of the social media system.

Specific examples of currently available social media systems include, but are not limited to: Facebook™; Twitter™; Linkedin™; Bebo™; Classmates.com™; Google Buzz™; MySpace™; and many other post, blogging, and user content provided, websites/networks as discussed herein, and/or as known in the art at the time of filing, and/or as developed after the time of filing.

In one embodiment, memory 101 includes user location update data 107 that includes instructions and data for initiating a user location and event update postings using process for automatically adding related event information to social media location updates 200 and providing location data, and other user location update data, such as date and time data associated with user actions.

In one embodiment, memory 101 includes user geo-position data 109. In one embodiment, geo-position data 109 is determined using a Global Positioning Satellite (GPS) system and/or a GPS capability provided with user computing system 100 (not shown).

In various embodiments, geo-position data 109 is determined based on analysis of a communication signal used and/or emitted by user mobile computing system 100 and/or the relay stations used by user computing system 100.

In various embodiments, geo-position data 109 is obtained from user computing system 100 itself via one or more data links.

In various embodiments, geo-position data 109 is determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and/or process, for obtaining location data associated with a computing system is omitted here to avoid detracting from the invention.

In one embodiment, all, or part, of user location update data 107 and geo-position data 109 is transferred from user computing system 100 to social media system 120 via communication interface 112, communication channel 401, and communications interface 122.

Also shown in FIG. 1 is events database 170. As used herein, the terms "database" and "data source" include, but are not limited to, any data storage mechanism known at the time of filing or as developed thereafter, such as, but not limited to: a data storage device; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

Herein, the term "event" includes any public or private meeting, gathering, entertainment function, or public function that is scheduled and/or calendared for a specific time and place. Specific illustrative examples of "events" include, but are not limited to, sports contests, concerts, movies, political meetings, poetry readings, comedy events, lectures, fund raisers, or any other gathering of people and/or happenings that are scheduled for a specific time and place.

As used herein, the terms "event database" and "event data source" include websites, databases, server systems, computing systems, memories, data feeds, and/or any other mechanisms, or means, for obtaining data indicating dates, times, and places, associated with scheduled events. Specific examples of event data sources/databases include, but are not limited to: websites and/or databases associated with local events calendars, such as local events websites and newspaper databases; websites and/or databases associated with event promoters and/or ticket sales, such as Ticketmaster™; websites and/or databases associated with social networks and systems such as Facebook™ events; websites and/or databases associated with businesses and public locations; websites and/or databases associated with business organizations such the Rotary Club or a local chamber of commerce; and/or any other websites, databases, or any other sources of event data, as discussed herein, and/or as known/available in the art at the time of filing, and/or as developed/made available after the time of filing.

As seen in FIG. 1, events database 170 includes events data 171. In various embodiments, events data 171 includes data associated with one or more events such as, but not limited to: the name of the event and/or the featured elements of the event, such as a concert name or the names of the bands performing; the scheduled start time and/or runtime of the event; the status of event, i.e., private, public, sold out, etc.; a brief description of the event with, or without, a story-like narrative of the event and why the event is interesting; and/or any other information regarding the event deemed of interest, or potential interest, to a reader of the post.

In one embodiment, all, or part, of events data 171 is transferred from events database 170 to social media system 120, or made accessible to social media system 120, via communication channel 403, and communications interface 122.

In various embodiments, one, or both, of communication channels 401 and 403 can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, and/or databases, whether available or known at the time of filing or as later developed.

Those of skill in the art will readily recognize that the components shown in FIG. 1, and their respective sub-components, are shown for illustrative purposes only and that architectures with more or fewer components can implement, and benefit from, one or more embodiments. Moreover, one or more components may be located remotely from their respective system.

Process

In accordance with one embodiment, a process for automatically adding related event information to social media location updates integrates one or more event data sources into the social media location update process and thereby provides the ability to automatically identify events associated with the identified location of a social media location update and automatically include information describing the identified event in a social media location and event update posting.

Figure 2:
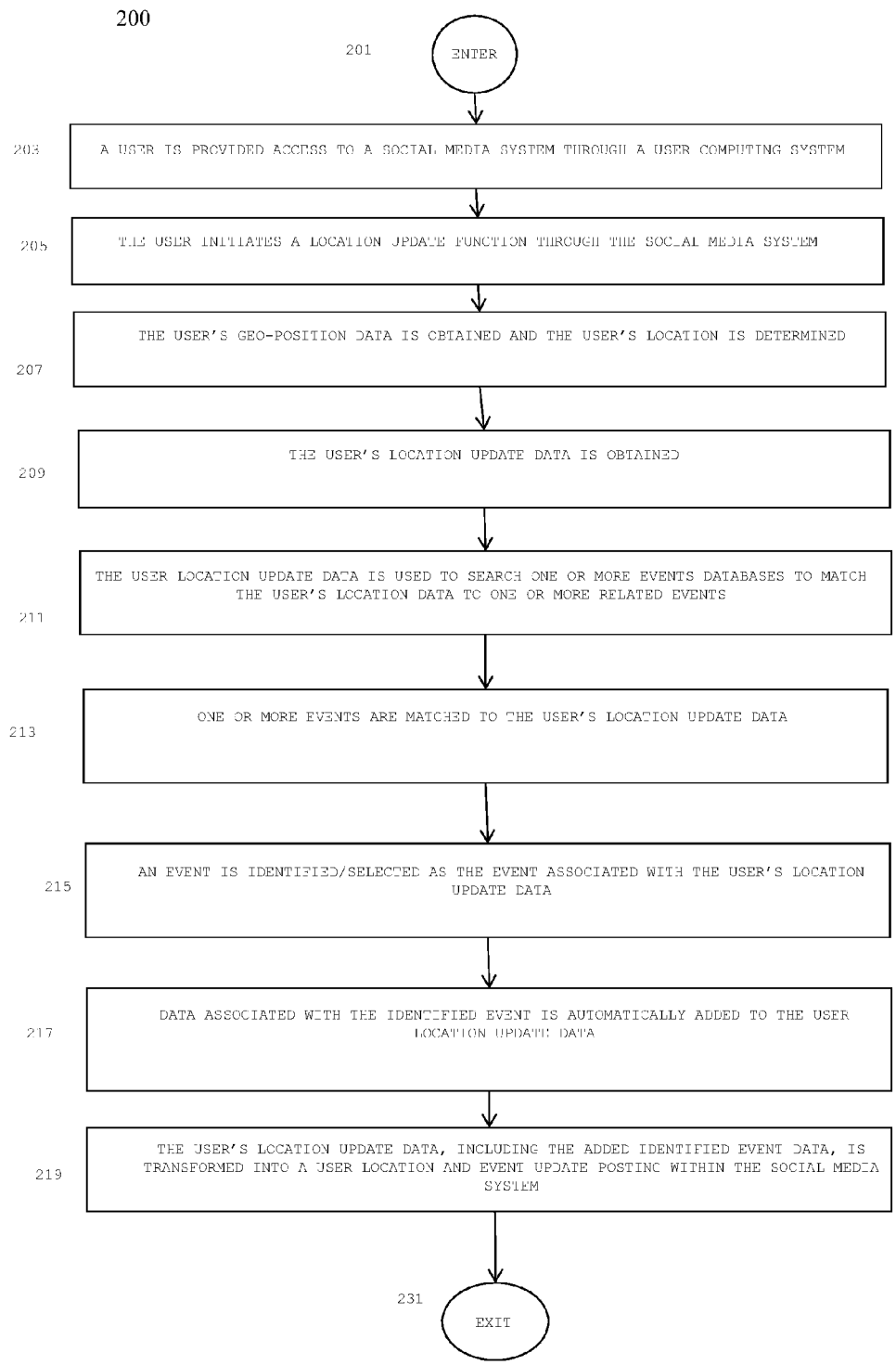
FIG. 2 is a flow chart depicting one example of a process for automatically adding related event information to social media location updates in accordance with one embodiment.

FIG. 2 a flow chart depicting a process for automatically adding related event information to social media location updates 200 in accordance with one embodiment. Process for automatically adding related event information to social media location updates 200 begins at ENTER OPERATION 201 of FIG. 2 and process flow proceeds to A USER IS PROVIDED ACCESS TO A SOCIAL MEDIA SYSTEM THROUGH A USER COMPUTING SYSTEM OPERATION 203.

In one embodiment, at A USER IS PROVIDED ACCESS TO A SOCIAL MEDIA SYSTEM THROUGH A USER COMPUTING SYSTEM OPERATION 203 a user is provided access to a social media system through a user computing system.

In various embodiments, the user computing system of A USER IS PROVIDED ACCESS TO A SOCIAL MEDIA SYSTEM THROUGH A USER COMPUTING SYSTEM OPERATION 203 is any computing system, or mobile computing system, such as user computing system 100 of FIG. 1, and/or as discussed herein, and/or as known in the art at the time of filing, and/or as developed/made available, after the time of filing such as, but is not limited to: a desktop computer; a portable computer; a workstation; a two-way pager; a cellular telephone; a smart phone; a tablet computing system; a notebook computing system; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein.

In addition, as used herein, the term computing system, can denote, but is not limited to, computing systems made up of multiple: computers; wireless devices; cellular telephones; smart phones; two-way pagers; PDAs; media players; server computers; or any desired combination of these devices, that are coupled to perform the processes and/or operations as described herein.

Herein, the term "mobile computing system" and "mobile device" are used interchangeably and include, but are not limited to: a portable computer; a two-way pager; a cellular telephone; a smart phone; a tablet computing system; a notebook computing system; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein.

In addition, as used herein, the term mobile computing system and/or mobile device, can denote, but is not limited to, computing systems made up of multiple: wireless devices; cellular telephones; smart phones; digital telephones; two-way pagers; PDAs; tablet computing systems; notebook computing systems; media players; or any desired combination of these devices and/or computing systems, that are coupled to perform the processes and/or operations as described herein.

In some embodiments, one or more mobile computing systems are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Returning to FIG. 2, in one embodiment, the social media system of A USER IS PROVIDED ACCESS TO A SOCIAL MEDIA SYSTEM THROUGH A USER COMPUTING SYSTEM OPERATION 203 is any social media system, social media website, and social media network, regardless of distribution and access means, such as social media system 120 of FIG. 1. Herein, social media systems, social media websites, and social media networks, are collectively referred to as "social media systems". Herein, social media systems include, but are not limited to, computing system implemented networks, systems and sites that allow users to provide content, often in the form of posts, about themselves and to track and view posts from selected other users of the social media system.

Specific examples of currently available social media systems include, but are not limited to: Facebook™; Twitter™; Linkedin™; Bebo™; Classmates.com™; Google Buzz™; MySpace™; and many other post, blogging, and user content provided, websites/networks as discussed herein, and/or as known in the art at the time of filing, and/or as developed after the time of filing.

Returning to FIG. 2, once the user is provided access to a social media system through a user computing system at A USER IS PROVIDED ACCESS TO A SOCIAL MEDIA SYSTEM THROUGH A USER COMPUTING SYSTEM OPERATION 203, process flow proceeds to THE USER INITIATES A LOCATION UPDATE FUNCTION THROUGH THE SOCIAL MEDIA SYSTEM OPERATION 205.

In one embodiment, at THE USER INITIATES A LOCATION UPDATE FUNCTION THROUGH THE SOCIAL MEDIA SYSTEM OPERATION 205 the user initiates a user location and event update feature through the social media system.

In one embodiment, at THE USER INITIATES A LOCATION UPDATE FUNCTION THROUGH THE SOCIAL MEDIA SYSTEM OPERATION 205 the user initiates a user location and event update feature through the social media system by activating a user location update icon, symbol, etc., from a user interface screen for the social media system displayed on a display device, such as display device 111 of FIG. 1, of a mobile user computing system, such as a smart phone.

Returning to FIG. 2, once the user initiates a user location and event update feature through the social media system at THE USER INITIATES A LOCATION UPDATE FUNCTION THROUGH THE SOCIAL MEDIA SYSTEM OPERATION 205, process flow proceeds to THE USER'S GEO-POSITION DATA IS OBTAINED AND THE USER'S LOCATION IS DETERMINED OPERATION 207.

In one embodiment, at THE USER'S GEO-POSITION DATA IS OBTAINED AND THE USER'S LOCATION IS DETERMINED OPERATION 207 the user's geo-position data is obtained and/or determined.

In one embodiment, at THE USER'S GEO-POSITION DATA IS OBTAINED AND THE USER'S LOCATION IS DETERMINED OPERATION 207 the user's geo-position data, such as user geo-position data 109 of FIG. 1, is obtained and/or determined.

Returning to FIG. 2, in one embodiment, at THE USER'S GEO-POSITION DATA IS OBTAINED AND THE USER'S LOCATION IS DETERMINED OPERATION 207 the user's geo-position data is determined using a Global Positioning Satellite (GPS) system and/or a GPS capability provided with the user computing system of A USER IS PROVIDED ACCESS TO A SOCIAL MEDIA SYSTEM THROUGH A USER COMPUTING SYSTEM OPERATION 203.

In various embodiments, at THE USER'S GEO-POSITION DATA IS OBTAINED AND THE USER'S LOCATION IS DETERMINED OPERATION 207 the user's geo-position data is determined based on analysis of a communication signal used and/or emitted by the user mobile computing system of A USER IS PROVIDED ACCESS TO A SOCIAL MEDIA SYSTEM THROUGH A USER COMPUTING SYSTEM OPERATION 203, and/or the relay stations used by the user computing system.

In various embodiments, at THE USER'S GEO-POSITION DATA IS OBTAINED AND THE USER'S LOCATION IS DETERMINED OPERATION 207 the user's geo-position data is determined by the user computing system itself via one or more data links.

In other embodiments, at THE USER'S GEO-POSITION DATA IS OBTAINED AND THE USER'S LOCATION IS DETERMINED OPERATION 207 the user's geo-position data is determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and/or process, for obtaining location data associated with a computing system is omitted here to avoid detracting from the invention.

In one embodiment, at THE USER'S GEO-POSITION DATA IS OBTAINED AND THE USER'S LOCATION IS DETERMINED OPERATION 207 the user's geo-position data is used to identify one or more businesses, or other identified "locations", such as a school, mall, auditorium, government facility, or other public place, associated with the user's geo-position data.

In one embodiment, at THE USER'S GEO-POSITION DATA IS OBTAINED AND THE USER'S LOCATION IS DETERMINED OPERATION 207 the user is provided a listing of the potential one or more businesses, or other identified "locations" and the user selects a correct one of the one or more businesses or identified locations as the current location of the user.

In one embodiment, once the user's geo-position data is obtained and/or location is determined at THE USER'S GEO-POSITION DATA IS OBTAINED AND THE USER'S LOCATION IS DETERMINED OPERATION 207, process flow proceeds to THE USER'S LOCATION UPDATE DATA IS OBTAINED OPERATION 209.

In one embodiment, at THE USER'S LOCATION UPDATE DATA IS OBTAINED OPERATION 209 user location update data such as data indicating the time and the date is obtained.

In one embodiment, at THE USER'S LOCATION UPDATE DATA IS OBTAINED OPERATION 209 user location update data such as user location update data 107 of FIG. 1, is obtained.

Returning to FIG. 2, once user location update data such as data indicating the time and the date is obtained at THE USER'S LOCATION UPDATE DATA IS OBTAINED OPERATION 209, process flow proceeds to THE USER LOCATION UPDATE DATA IS USED TO SEARCH ONE OR MORE EVENTS DATABASES TO MATCH THE USER'S LOCATION DATA TO ONE OR MORE RELATED EVENTS OPERATION 211.

In one embodiment, at THE USER LOCATION UPDATE DATA IS USED TO SEARCH ONE OR MORE EVENTS DATABASES TO MATCH THE USER'S LOCATION DATA TO ONE OR MORE RELATED EVENTS OPERATION 211 the data indicating the selected business or other location of the user of THE USER'S GEO-POSITION DATA IS OBTAINED AND THE USER'S LOCATION IS DETERMINED OPERATION 207 and the time and date data of THE USER'S LOCATION UPDATE DATA IS OBTAINED OPERATION 209 is used to search one or more event data sources/event databases, for one or more events that "match", or most closely match, the data indicating the selected business or other location of the user and the time and date data.

In one embodiment, the data indicating the selected business or other location of the user and the time and date data is used to search one or more event data sources/event databases, such as events database 170 of FIG. 1, for one or more events that "match", or most closely match, the data indicating the selected business or other location of the user and the time and date data As used herein, the terms "database" and "data source" include, but are not limited to, any data storage mechanism known at the time of filing or as developed thereafter, such as, but not limited to: a data storage device; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

Herein, the term "event" includes any public or private meeting, gathering, entertainment function, or public function that is scheduled and/or calendared for a specific time and place. Specific illustrative examples of "events" include, but are not limited to, sports contests, concerts, movies, political meetings, poetry readings, comedy events, lectures, fund raisers, or any other gathering of people and/or happenings that are scheduled for a specific time and place.

As used herein, the terms "event database" and "event data source" include websites, databases, server systems, computing systems, memories, data feeds, and/or any other mechanisms, or means, for obtaining data indicating dates, times, and places, associated with scheduled events. Specific examples of event data sources/databases include, but are not limited to: websites and/or databases associated with local events calendars, such as local events websites and newspaper databases; websites and/or databases associated with event promoters and/or ticket sales such as Ticketmaster™; websites and/or databases associated with social networks and systems such as Facebook™ events; websites and/or databases associated with businesses and public locations; websites and/or databases associated with business organizations such the Rotary Club or a local chamber of commerce; and/or any other websites, databases, or any other sources of event data, as discussed herein, and/or as known/available in the art at the time of filing, and/or as developed/made available after the time of filing.

Returning to FIG. 2, in one embodiment, data from the one or more event data sources/event databases, such as events data 171 of FIG. 1, is updated/downloaded on a periodic basis by process for automatically adding related event information to social media location updates 200 to ensure the event data is current.

In one embodiment, once the data indicating the selected business or other location of the user and the time and date data is used to search one or more event data sources/event databases for one or more events that "match", or most closely match, the data indicating the selected business or other location of the user and the time and date data at THE USER LOCATION UPDATE DATA IS USED TO SEARCH ONE OR MORE EVENTS DATABASES TO MATCH THE USER'S LOCATION DATA TO ONE OR MORE RELATED EVENTS OPERATION 211, process flow proceeds to ONE OR MORE EVENTS ARE MATCHED TO THE USER'S LOCATION UPDATE DATA OPERATION 213.

In one embodiment, at ONE OR MORE EVENTS ARE MATCHED TO THE USER'S LOCATION UPDATE DATA OPERATION 213, as a result of the search of the one or more event data sources/event databases using the data indicating the selected business or other location of the user and the time and date data of THE USER LOCATION UPDATE DATA IS USED TO SEARCH ONE OR MORE EVENTS DATABASES TO MATCH THE USER'S LOCATION DATA TO ONE OR MORE RELATED EVENTS OPERATION 211, one or more events that match, or most closely match, the data indicating the selected business or other location of the user and the time and date data are identified.

In one embodiment, at ONE OR MORE EVENTS ARE MATCHED TO THE USER'S LOCATION UPDATE DATA OPERATION 213 the one or more identified events are presented to the user in a potential events listing displayed on a display device, such as display device 111 of FIG. 1, of a user computing system, such as user computing system 100 of FIG. 1, that includes all identified potential events the user may be attending at the identified location.

In one embodiment, once one or more events that match, or most closely match, the data indicating the selected business or other location of the user and the time and date data are identified at ONE OR MORE EVENTS ARE MATCHED TO THE USER'S LOCATION UPDATE DATA OPERATION 213, process flow proceeds to AN EVENT IS IDENTIFIED/SELECTED AS THE EVENT ASSOCIATED WITH THE USER'S LOCATION UPDATE DATA OPERATION 215.

In one embodiment, at AN EVENT IS IDENTIFIED/SELECTED AS THE EVENT ASSOCIATED WITH THE USER'S LOCATION UPDATE DATA OPERATION 215, the actual event the user is attending is identified.

As noted above, in one embodiment, at ONE OR MORE EVENTS ARE MATCHED TO THE USER'S LOCATION UPDATE DATA OPERATION 213 the one or more identified events are presented to the user in a potential events listing displayed on a display device of the user computing system that includes all identified potential events the user may be attending at the identified location. In one embodiment, at AN EVENT IS IDENTIFIED/SELECTED AS THE EVENT ASSOCIATED WITH THE USER'S LOCATION UPDATE DATA OPERATION 215 the user selects the actual event the user is attending by clicking, or otherwise selecting, highlighting, or activating, the correct event entry in the potential events listing via a user interface device and the display device of the user computing system.

In one embodiment, only a single event that matches, or most closely matches, the data indicating the selected business or other location of the user and the time and date data is identified. In one embodiment, the single identified event is presented to the user in the potential events listing displayed on a display device of the user computing system and at AN EVENT IS IDENTIFIED/SELECTED AS THE EVENT ASSOCIATED WITH THE USER'S LOCATION UPDATE DATA OPERATION 215 the user confirms the user is attending the event by clicking, or otherwise activating, the single event entry in the potential events listing via a user interface device and the display device of the user computing system.

In one embodiment, the user pre-authorizes process for automatically adding related event information to social media location updates 200 to automatically select any single event entry that is the only identified event, without further user input at AN EVENT IS IDENTIFIED/SELECTED AS THE EVENT ASSOCIATED WITH THE USER'S LOCATION UPDATE DATA OPERATION 215.

In one embodiment, once the actual event the user is attending is identified, data associated with the event, such as events data 171 of FIG. 1, is obtained at AN EVENT IS IDENTIFIED/SELECTED AS THE EVENT ASSOCIATED WITH THE USER'S LOCATION UPDATE DATA OPERATION 215 (FIG. 2).

In one embodiment, the data associated with the event of AN EVENT IS IDENTIFIED/SELECTED AS THE EVENT ASSOCIATED WITH THE USER'S LOCATION UPDATE DATA OPERATION 215 includes, but is not limited to: the name of the event and/or the featured elements of the event, such as a concert name or the names of the bands performing; the scheduled start time and/or runtime of the event; the status of event, i.e., private, public, sold out, etc., and/or any other information regarding the event deemed of interest or potential interest to a reader of the post.

In one embodiment, the data associated with the event of at AN EVENT IS IDENTIFIED/SELECTED AS THE EVENT ASSOCIATED WITH THE USER'S LOCATION UPDATE DATA OPERATION 215 includes a brief description of the event with, or without, a story-like narrative of the event and why the event is interesting. In one embodiment, the data associated with the event includes information identifying, and/or describing, the business or location sponsoring the event and/or any other forum/venue associated with the event.

In various embodiments, the data associated with the event of AN EVENT IS IDENTIFIED/SELECTED AS THE EVENT ASSOCIATED WITH THE USER'S LOCATION UPDATE DATA OPERATION 215 is obtained from one or more of the event databases and/or event data sources, such as events database 170 of FIG. 1.

In various embodiments, the data associated with the event is obtained from any source of event data as discussed herein, and/or as known/available in the art at the time of filing, and/or as developed/made available after the time of filing.

Returning to FIG. 2, in one embodiment, once the actual event the user is attending is identified at AN EVENT IS IDENTIFIED/SELECTED AS THE EVENT ASSOCIATED WITH THE USER'S LOCATION UPDATE DATA OPERATION 215, process flow proceeds to DATA ASSOCIATED WITH THE IDENTIFIED EVENT IS AUTOMATICALLY ADDED TO THE USER LOCATION UPDATE DATA OPERATION 217.

In one embodiment, at DATA ASSOCIATED WITH THE IDENTIFIED EVENT IS AUTOMATICALLY ADDED TO THE USER LOCATION UPDATE DATA OPERATION 217 the data indicating the identified event the user is attending at the identified business or other location of the user and the data associated with the event the user is attending is added to the user location update data of THE USER'S LOCATION UPDATE DATA IS OBTAINED OPERATION 209.

In one embodiment, once the data indicating the identified event the user is attending at the identified business or other location of the user and the data associated with the event the user is attending is added to the user location update data at DATA ASSOCIATED WITH THE IDENTIFIED EVENT IS AUTOMATICALLY ADDED TO THE USER LOCATION UPDATE DATA OPERATION 217, process flow proceeds to THE USER'S LOCATION UPDATE DATA, INCLUDING THE ADDED IDENTIFIED EVENT DATA, IS TRANSFORMED INTO A USER'S LOCATION AND EVENT UPDATE POSTING WITHIN THE SOCIAL MEDIA SYSTEM OPERATION 219.

In one embodiment, at THE USER'S LOCATION UPDATE DATA, INCLUDING THE ADDED IDENTIFIED EVENT DATA, IS TRANSFORMED INTO A USER'S LOCATION AND EVENT UPDATE POSTING WITHIN THE SOCIAL MEDIA SYSTEM OPERATION 219 any, or all, of: the data indicating the identified business or other location of the user of THE USER'S GEO-POSITION DATA IS OBTAINED AND THE USER'S LOCATION IS DETERMINED OPERATION 207; data indicating the identified event the user is attending at the identified business or other location of the user of AN EVENT IS IDENTIFIED/SELECTED AS THE EVENT ASSOCIATED WITH THE USER'S LOCATION UPDATE DATA OPERATION 215; the data associated with the event the user is attending at the identified business or other location of the user of AN EVENT IS IDENTIFIED/SELECTED AS THE EVENT ASSOCIATED WITH THE USER'S LOCATION UPDATE DATA OPERATION 215; and/or the other location update data, such as time and date data of THE USER'S LOCATION UPDATE DATA IS OBTAINED OPERATION 209, is automatically transformed into a user location and event update posting, such as a modified Facebook™ "check-in" posting, that details not only the business or other location of the user at the time of the posting, but also the event the user is attending at the business or other location.

In one embodiment, at THE USER'S LOCATION UPDATE DATA, INCLUDING THE ADDED IDENTIFIED EVENT DATA, IS TRANSFORMED INTO A USER'S LOCATION AND EVENT UPDATE POSTING WITHIN THE SOCIAL MEDIA SYSTEM OPERATION 219 the user location and event update posting is then automatically posted on the user's presence within the social media system, such as the user's account or webpage within the social media system, and/or is distributed to pre-selected friends or other contacts associated with the user via any posting mechanism associated with the social media system, as discussed herein, and/or as known in the art/available at the time of filing, and/or as developed/made available after the time of filing.

In one embodiment, the user location and event update postings for multiple users, and/or the data indicating the identified business or other location of the users and data indicating the identified event the users are attending at the identified business or other location, is analyzed and used to improve the matching of the event to the given identified business or other location, i.e., location and event data in the user location and event update postings for multiple users linking/matching a given event with a given location is used to provide a self-learning feedback loop to improve the event and location matching for other user location and event update postings during a relevant time frame for the event.

As one specific example, if the user location and event update postings for a threshold number of users indicates Santana is performing at Sammy's Coffee Shop at 11 PM on Jan. 1, 2012, then, in one embodiment, "watching Santana perform" is the default event linked/matched to any location data from other users indicating Sammy's Coffee Shop is the location of the user. In one embodiment, this default linking/matching is maintained for a defined period of time, such as the next 60 minutes.

As a more detailed specific illustrative example of one embodiment, assume a user named John accesses Facebook™ from his iPhone™ and activates the "check-in" feature from a location of an event he is attending at THE USER INITIATES A LOCATION UPDATE FUNCTION THROUGH THE SOCIAL MEDIA SYSTEM OPERATION 205.

In this specific illustrative example, John opens the Facebook™ mobile application and selects Sammy's Coffee Shop from nearby locations at THE USER'S GEO-POSITION DATA IS OBTAINED AND THE USER'S LOCATION IS DETERMINED OPERATION 207.

In accordance with one embodiment of process for automatically adding related event information to social media location updates 200, the Facebook™ geo-locator check-in API automatically calls a process API associated with process for automatically adding related event information to social media location updates 200 and the process API automatically cross-references John's location with pre-determined event data sources/event databases of event information, such as Ticketmaster™, Facebook™ events, small business websites from Intuit Business Directory™, and/or any other event data source/event database associated with process for automatically adding related event information to social media location updates 200.

In one embodiment, process for automatically adding related event information to social media location updates 200 automatically searches the event data sources/event databases at THE USER LOCATION UPDATE DATA IS USED TO SEARCH ONE OR MORE EVENTS DATABASES TO MATCH THE USER'S LOCATION DATA TO ONE OR MORE RELATED EVENTS OPERATION 211 to identify likely events happening at or nearby John's check-in location, as determined by the user location update data such as location, date and time.

In this specific illustrative example of one embodiment, at ONE OR MORE EVENTS ARE MATCHED TO THE USER'S LOCATION UPDATE DATA OPERATION 213 process for automatically adding related event information to social media location updates 200 scrubs a TicketMaster™ database and determines that the band Santana is playing a show at Sammy's Coffee Shop on the day, and time, of the John's Facebook™ check-in.

In this specific illustrative example of one embodiment, at ONE OR MORE EVENTS ARE MATCHED TO THE USER'S LOCATION UPDATE DATA OPERATION 213 process for automatically adding related event information to social media location updates 200 presents the event "watching a Santana performance" as the potential event that John is attending.

In this specific illustrative example of one embodiment, at AN EVENT IS IDENTIFIED/SELECTED AS THE EVENT ASSOCIATED WITH THE USER'S LOCATION UPDATE DATA OPERATION 215 John is provided the opportunity to select/confirm this event within the Facebook™ application, and, once selected, at DATA ASSOCIATED WITH THE IDENTIFIED EVENT IS AUTOMATICALLY ADDED TO THE USER LOCATION UPDATE DATA OPERATION 217 process for automatically adding related event information to social media location updates 200 pre-populates the event, and the data associated with the event, in a user location and event update posting, e.g., in a modified Facebook™ check-in posting that is generated at THE USER'S LOCATION UPDATE DATA, INCLUDING THE ADDED IDENTIFIED EVENT DATA, IS TRANSFORMED INTO A USER'S LOCATION AND EVENT UPDATE POSTING WITHIN THE SOCIAL MEDIA SYSTEM OPERATION 219.

As a result, John is provided a user location and event update posting at THE USER'S LOCATION UPDATE DATA, INCLUDING THE ADDED IDENTIFIED EVENT DATA, IS TRANSFORMED INTO A USER'S LOCATION AND EVENT UPDATE POSTING WITHIN THE SOCIAL MEDIA SYSTEM OPERATION 219 indicating he is at Sammy's Coffee Shop and that he is attending a Santana performance, all with minimal data entry from John.

In this specific illustrative example of one embodiment, once enough people associate Santana's concert with the check-in location of Sammy's Coffee Shop, the process for automatically adding related event information to social media location updates can make smarter and faster default recommendations to other users trying to check in to Sammy's Cafe who are also there to see Santana.

Returning to FIG. 2, in one embodiment, once any, or all, of: the data indicating the identified business or other location of the user; data indicating the identified event the user is attending at the identified business or other location; the data associated with the event the user is attending at the identified business or other location; and/or the other location update data, such as time and date data, is automatically transformed into a user location and event update posting, such as a modified Facebook "check-in" posting, that details not only the business or other location of the user at the time of the posting, but also the event the user is attending at the business or other location at THE USER'S LOCATION UPDATE DATA, INCLUDING THE ADDED IDENTIFIED EVENT DATA, IS TRANSFORMED INTO A USER'S LOCATION AND EVENT UPDATE POSTING WITHIN THE SOCIAL MEDIA SYSTEM OPERATION 219, process flow proceeds to EXIT OPERATION 231.

In one embodiment, at EXIT OPERATION 231, process for automatically adding related event information to social media location updates 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for automatically adding related event information to social media location updates 200, users of social media systems can provide more detailed location updates that not only indicate the user's location, but also the event the user is attending at the location; all without having to manually enter additional text or provide any significant additional user input. Consequently, using process for automatically adding related event information to social media location updates 200, not only are users provided the ability to relatively effortlessly post more interesting and accurate location updates, but businesses and other public forums hosting events are provided a new marketing and advertisement opportunity for the events they host.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, and/or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for automatically adding related event information to social media location updates comprising:
providing a user location and event update feature through a social media system;
a user activating the user location and event update feature through a user computing system;
obtaining a user's geo-position data associated with the user computing system;
identifying a business or other location associated with the user's geo-position data;
obtaining date and time data associated with the user activation of the user location and event update feature;
using the identified business or other location associated with the user's geo-position data and the date and time data to search one or more events data sources for events matching, or most closely matching, the identified business or other location associated with the user's geo-position data and the date and time data;
identifying an event matching the identified business or other location associated with the user's geo-position data and the date and time data that is the event being attended by the user;
obtaining event data for the identified event;

transforming at least part of data indicating the identified business or other location associated with the user's geo-position data, the date and time data, and the event data for the identified event into a user location and event update posting;

automatically posting the user location and event update posting through the social media system;

receiving, at the social media system over a predefined length of time, at least a threshold number of user location and event update postings indicating the same selected event at the same location; and responsive to the receipt of at least a threshold number of user location and event update postings indicating the same selected event at the same location, defining the selected event and the selected location as a default selection for further user location and event update postings within the predefined time period.

2. The method for automatically adding related event information to social media location updates of claim 1, wherein;
the user computing system is a mobile computing system.

3. The method for automatically adding related event information to social media location updates of claim 1, wherein;
the user computing system is a mobile phone.

4. The method for automatically adding related event information to social media location updates of claim 1, wherein;
identifying a business or other location associated with the user's geo-position data includes presenting the user with a listing of potential businesses or other locations associated with the user's geo-position data and the user selecting one of the listed potential businesses or other locations associated with the user's geo-position data as the user's actual location.

5. The method for automatically adding related event information to social media location updates of claim 1, wherein;
at least one of the events data sources is selected form the group of events data sources consisting of:
websites and/or databases associated with local events calendars;
websites and/or databases associated with event promoters and/or ticket sales;
websites and/or databases associated with social networks and systems;
websites and/or databases associated with businesses and public locations; and
websites and/or databases associated with business organizations.

6. The method for automatically adding related event information to social media location updates of claim 1, wherein;
identifying an event matching the identified business or other location associated with the user's geo-position data and the date and time data that is the event being attended by the user includes presenting the user with a potential events listing of one or more events matching, or most closely matching, the identified business or other location associated with the user's geo-position data and the user selecting the event in the potential events listing which the user is attending.

7. The method for automatically adding related event information to social media location updates of claim 1, wherein;
at least part of the event data obtained for the identified event is selected for the group of event data consisting of:
the name of the event and/or the featured elements of the event;
the scheduled start time and/or runtime of the event;
the status of event; and
a brief description of the event.

8. A computing system implemented process for automatically adding related event information to social media location updates comprising:
using one or more processors to provide a user location and event update feature through a social media system;
a user activating the user location and event update feature through a user computing system;
using one or more processors to obtain a user's geo-position data associated with the user computing system;
using one or more processors to identify a business or other location associated with the user's geo-position data;
using one or more processors to obtain date and time data associated with the user activation of the user location and event update feature;
automatically using the identified business or other location associated with the user's geo-position data and the date and time data to search one or more events data sources for events matching, or most closely matching, the identified business or other location associated with the user's geo-position data and the date and time data under the direction of one or more processors;
using one or more processors to identify an event matching the identified business or other location associated with the user's geo-position data and the date and time data that is the event being attended by the user;
using one or more processors to automatically obtain event data for the identified event;
using one or more processors to automatically transform at least part of data indicating the identified business or other location associated with the user's geo-position data, the date and time data, and the event data for the identified event into a user location and event update posting;
using one or more processors to automatically post the user location and event update posting through the social media system;
receiving, at the social media system over a predefined length of time, at least a threshold number of user location and event update postings indicating the same selected event at the same location; and
responsive to the receipt of at least a threshold number of user location and event update postings indicating the same selected event at the same location, defining the selected event and the selected location as a default selection for further user location and event update postings within the predefined time period.

9. The computing system implemented process for automatically adding related event information to social media location updates of claim 8, wherein;
the user computing system is a mobile computing system.

10. The computing system implemented process for automatically adding related event information to social media location updates of claim 8, wherein;
the user computing system is a mobile phone.

11. The computing system implemented process for automatically adding related event information to social media location updates of claim 8, wherein;
identifying a business or other location associated with the user's geo-position data includes presenting the user with a listing of potential businesses or other locations associated with the user's geo-position data and the user selecting one of the listed potential businesses or other locations associated with the user's geo-position data as the user's actual location.

12. The computing system implemented process for automatically adding related event information to social media location updates of claim 8, wherein;

at least one of the events data sources is selected form the group of events data sources consisting of:
websites and/or databases associated with local events calendars;
websites and/or databases associated with event promoters and/or ticket sales;
websites and/or databases associated with social networks and systems;
websites and/or databases associated with businesses and public locations; and
websites and/or databases associated with business organizations.

13. The computing system implemented process for automatically adding related event information to social media location updates of claim 8, wherein;
identifying an event matching the identified business or other location associated with the user's geo-position data and the date and time data that is the event being attended by the user includes presenting the user with a potential events listing of one or more events matching, or most closely matching, the identified business or other location associated with the user's geo-position data and the user selecting the event in the potential events listing which the user is attending.

14. The computing system implemented process for automatically adding related event information to social media location updates of claim 8, wherein;
at least part of the event data obtained for the identified event is selected for the group of event data consisting of:
the name of the event and/or the featured elements of the event;
the scheduled start time and/or runtime of the event;
the status of event; and
a brief description of the event.

15. A system for automatically adding related event information to social media location updates comprising:
a user computing system;
a social media system;
one or more events data sources; and
one or more processors associated with one or more computing systems, the one or more processors associated with one or more computing systems implementing at least part of a process for automatically adding related event information to social media location updates, the process for automatically adding related event information to social media location updates including:
using the one or more processors associated with one or more computing systems to provide a user location and event update feature through the social media system;
a user activating the user location and event update feature through the user computing system;
using the one or more processors associated with one or more computing systems to obtain a user's geo-position data associated with the user computing system;
using the one or more processors associated with one or more computing systems to identify a business or other location associated with the user's geo-position data;
using the one or more processors associated with one or more computing systems to obtain date and time data associated with the user activation of the user location and event update feature;
automatically using the identified business or other location associated with the user's geo-position data and the date and time data to search the one or more events data sources for events matching, or most closely matching, the identified business or other location associated with the user's geo-position data and the date and time data under the direction of the one or more processors associated with one or more computing systems;
using the one or more processors associated with one or more computing systems to identify an event matching the identified business or other location associated with the user's geo-position data and the date and time data that is the event being attended by the user;
using the one or more processors associated with one or more computing systems to automatically obtain event data for the identified event;
using the one or more processors associated with one or more computing systems to automatically transform at least part of data indicating the identified business or other location associated with the user's geo-position data, the date and time data, and the event data for the identified event into a user location and event update posting;
using the one or more processors associated with one or more computing systems to automatically post the user location and event update posting through the social media system;
receiving, at the social media system over a predefined length of time, at least a threshold number of user location and event update postings indicating the same selected event at the same location; and
responsive to the receipt of at least a threshold number of user location and event update postings indicating the same selected event at the same location, defining the selected event and the selected location as a default selection for further user location and event update postings within the predefined time period.

16. The system for automatically adding related event information to social media location updates of claim 15, wherein;
the user computing system is a mobile computing system.

17. The system for automatically adding related event information to social media location updates of claim 15, wherein;
the user computing system is a mobile phone.

18. The system for automatically adding related event information to social media location updates of claim 15, wherein;
identifying a business or other location associated with the user's geo-position data includes presenting the user with a listing of potential businesses or other locations associated with the user's geo-position data and the user selecting one of the listed potential businesses or other locations associated with the user's geo-position data as the user's actual location.

19. The system for automatically adding related event information to social media location updates of claim 15, wherein;
at least one of the events data sources is selected form the group of events data sources consisting of:
websites and/or databases associated with local events calendars;
websites and/or databases associated with event promoters and/or ticket sales;
websites and/or databases associated with social networks and systems;
websites and/or databases associated with businesses and public locations; and
websites and/or databases associated with business organizations.

20. The system for automatically adding related event information to social media location updates of claim 15, wherein;
 identifying an event matching the identified business or other location associated with the user's geo-position data and the date and time data that is the event being attended by the user includes presenting the user with a potential events listing of one or more events matching, or most closely matching, the identified business or other location associated with the user's geo-position data and the user selecting the event in the potential events listing which the user is attending.

21. The system for automatically adding related event information to social media location updates of claim 15, wherein;
 at least part of the event data obtained for the identified event is selected for the group of event data consisting of:
 the name of the event and/or the featured elements of the event;
 the scheduled start time and/or runtime of the event;
 the status of event; and
 a brief description of the event.

\* \* \* \* \*